United States Patent [19]

Andrews

[11] 4,218,025
[45] Aug. 19, 1980

[54] CONVEYING APPARATUS HAVING LOAD-BEARING CONNECTING LINKS

[75] Inventor: Edwin T. Andrews, Winston-Salem, N.C.

[73] Assignee: Western Electric Company, Inc., New York, N.Y.

[21] Appl. No.: 969,043

[22] Filed: Dec. 13, 1978

[51] Int. Cl.³ .................... B65H 51/20; B65G 17/06
[52] U.S. Cl. ............................... 242/47.13; 198/851; 254/134.3 SC
[58] Field of Search .................................... 242/47.13; 254/134.3 SC; 198/852, 851

[56] References Cited

U.S. PATENT DOCUMENTS

| | | | |
|---|---|---|---|
| 930,798 | 8/1909 | Roberts et al. | 198/851 |
| 2,421,750 | 6/1947 | Gannett | 242/47.13 |
| 3,081,658 | 3/1963 | Witschi | 83/425 |
| 3,840,112 | 10/1974 | Hartwig | 198/202 |

Primary Examiner—Billy S. Taylor
Attorney, Agent, or Firm—J. B. Hoofnagle, Jr.

[57] ABSTRACT

A conveying apparatus (100) includes a frame (102) and a conveyor (104). The conveyor (104) includes a plurality of spaced article-support members (132) having planar undersurfaces (138). The article-support members (132) are supported on the frame (102) by a plurality of spaced supporting surfaces such as roller bearings (116). Connecting links (154), which connect adjacent pairs of article-support members (132), have planar undersurfaces (164) which are in planar alignment with the undersurface (138) of the article-support members (132) to provide a continuous planar undersurface for the conveyor (104) at least when the article-support members are being supported on the roller bearings (116) of the frame (102). The conveying apparatus (100) is used as an element of a cable-fleeting drum (10) for facilitating an oceanographic cable laying operation.

12 Claims, 10 Drawing Figures

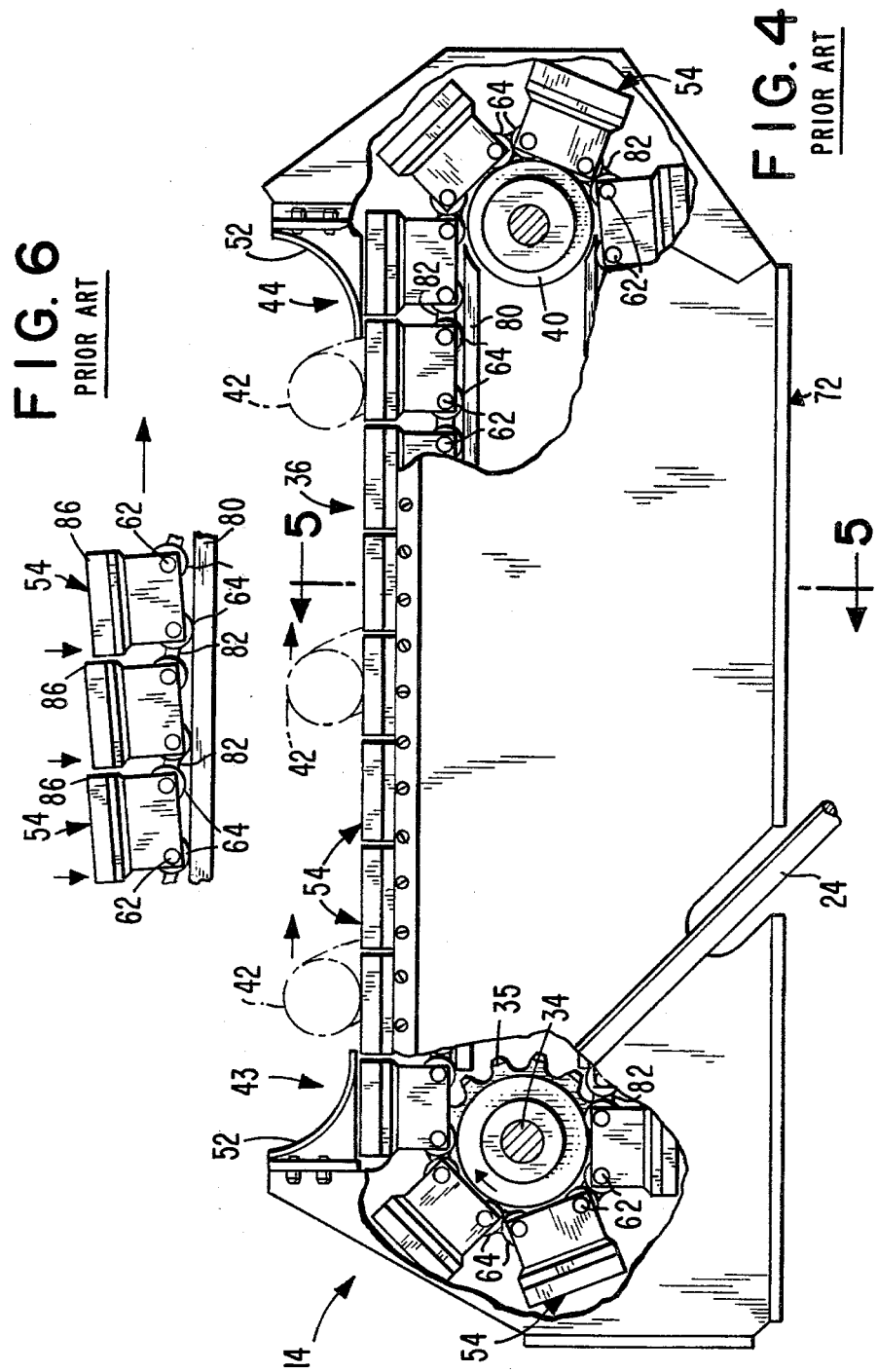

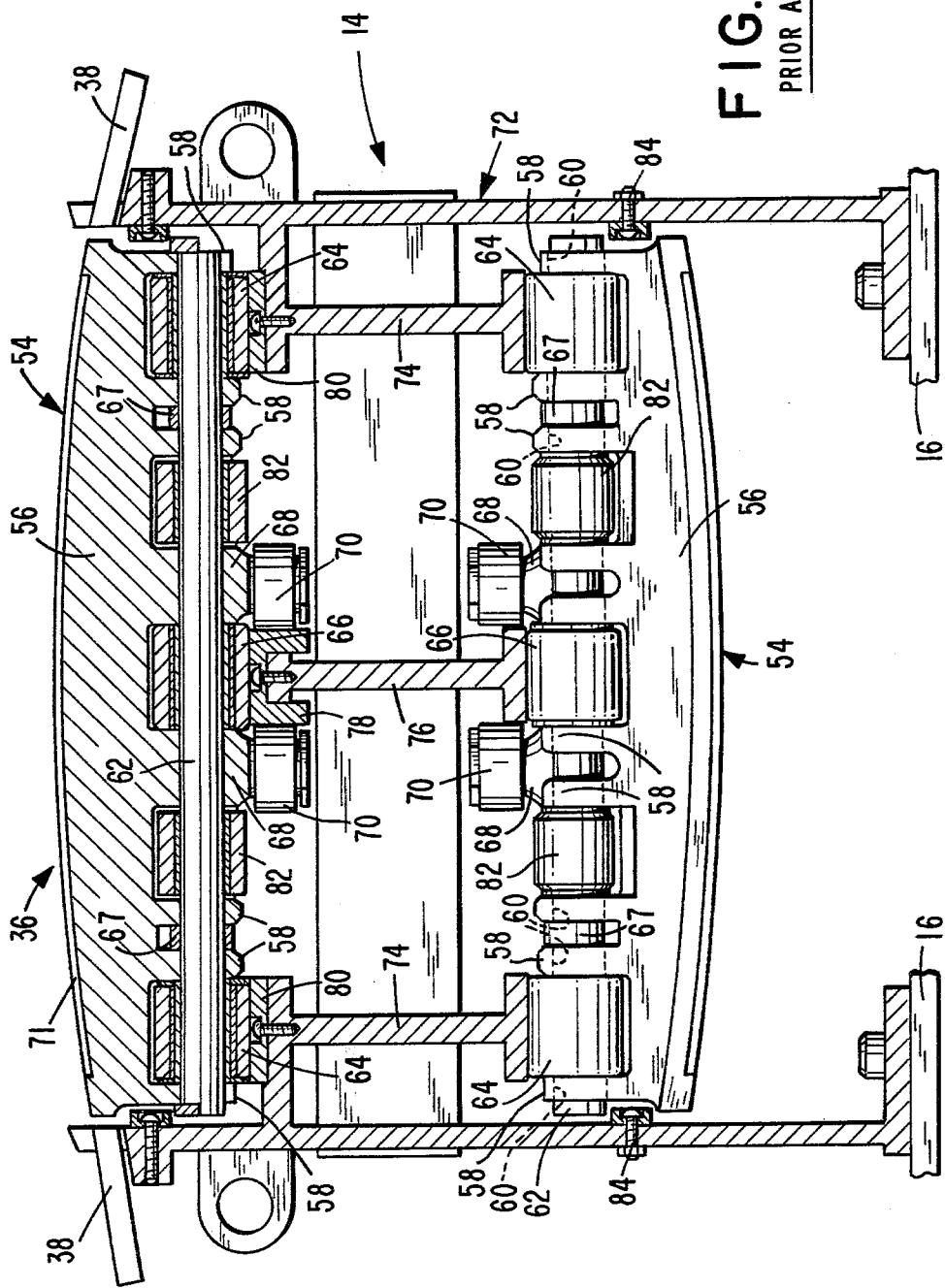

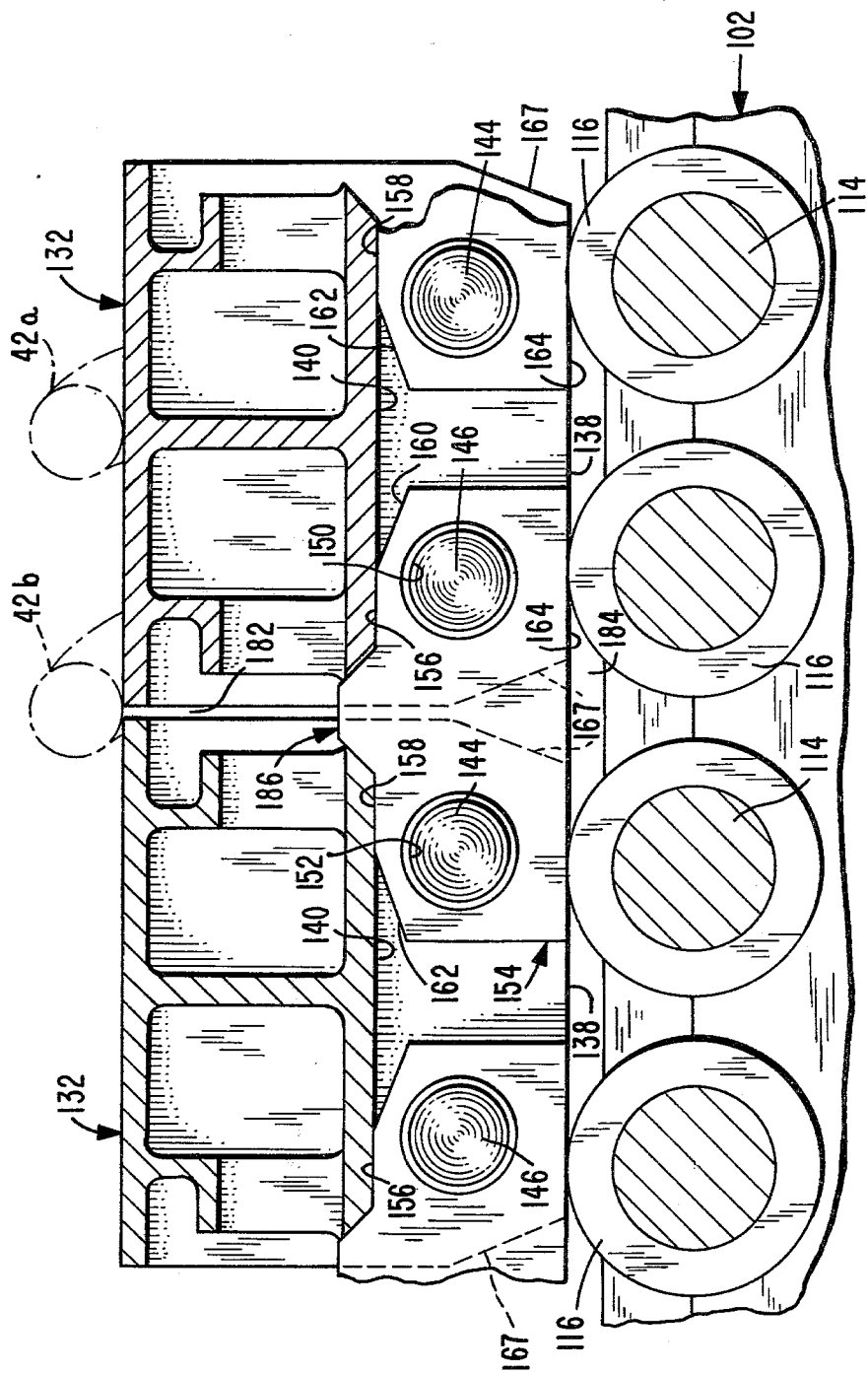

CONVEYING APPARATUS HAVING LOAD-BEARING CONNECTING LINKS

TECHNICAL FIELD

This invention relates to conveying apparatus having load-bearing connecting links and particularly relates to a conveyor having a plurality of interconnected load links which provide a uniform support surface while the conveyor is under load stresses.

BACKGROUND OF THE INVENTION

Aboard an oceanographic cable laying ship a cable fleeting drum is provided to facilitate an oceanographic cable laying/recovery operation.

The fleeting drum includes a pair of spaced fleeting flanges mounted at opposite sides thereof and a plurality of endless conveyors arranged for side-to-side movement between the flanges parallel to the axis of the drum. Outward surfaces of the endless conveyors form the peripheral surface of the drum. The conveyors are simultaneously driven in a given direction by a driving mechanism which is operative as the drum is rotated about its axis and thereby "fleets" or moves a cable wound over the drum from one side of the drum to the other.

In preparation for a cable laying operation, a leading end of a cable is wound about the periphery of the drum from an entry side of the drum adjacent to one fleeting flange to an exit side of the drum adjacent to the other fleeting flange. The fleeting drum is then driven about its axis thereby drawing successive portions of the cable onto the entry side of the drum as the conveyors are simultaneously driven in the given direction towards the exit side of the drum. In this manner, successive portions of the cable are drawn onto the peripheral conveyor surface of the drum and are moved or "fleeted" from the entry side of the drum to the exit side of the drum for subsequent lowering to the ocean floor from the exit side. In this process, the conveyors are intended to facilitate smooth uninterrupted payout or pickup of the cable during the cable laying/recovery operation.

The fleeting flanges are provided to retain the cable on the peripheral surface of the drum and are mounted at close tolerances above the surface of the conveyors so as to prevent cable having smaller diameters from becoming trapped or pinched between the conveyors and the fleeting flanges during the cable laying operation.

In the past, the conveyors included a plurality of interconnected load links each having two spaced bearing shafts with a set of roller bearings axially mounted on each shaft. An upper run of the conveyor was supported in a frame of the module having continuous planar support surfaces. The roller bearings of the load links slidably engaged the continuous planar support surfaces of the frame. Consequently, the load links on the upper run of the conveyor were positioned in one plane as the conveyor moved from one side of the drum to the other.

However, under certain loading conditions of the cable fleeting drum, wherein the load was not positioned directly over or between the two sets of roller bearings, one or more of the load links would pivot about one of the bearing shafts. As a result, one edge of the pivoting load links would protrude above the normally planar surface of the conveyor. The protruding edge of the load links would strike lower portions of the fleeting flanges, thus stopping the forward movement of the conveyor and causing severe damage to the driving mechanism thereof.

Furthermore, if a fleeting module was rendered inoperable because of bearing failure, the cable laying operation had to be discontinued until the inoperable fleeting module could be completely removed from the fleeting drum and replaced with a spare module. Because of the construction of the modules, the bearings on the conveyors could not be replaced without first removing the module from the drum. In addition, the effects of rust and corrosion on various portions of the conveyors usually prevented the removal of the conveyor from the module or the removal of the bearings from the conveyor without the aid of special tooling and equipment normally not available aboard ship. Therefore, the inoperable modules had to be returned to port for replacement of the bearings.

Unless there were spare modules aboard ship, the cable laying operation would have to be totally abandoned so that the ship could return to port to repair or replace the inoperable cable fleeting modules. This resulted in a time consuming and costly effort which usually required that the ship be placed out of service for an extended period of time.

Another past apparatus which includes a drum with several endless conveyors arranged to form the peripheral surface of the drum is disclosed in U.S. Pat. No. 3,081,658 to F. Witschi. The apparatus is provided to facilitate the cutting of a continuous strip of fabric from a wide web of fabric material. Successive portions of the fabric web are wound over the drum and are continuously moved from one side of the drum to the other by the endless conveyors as the drum rotates about its axis. The successive portions of the web are moved into engagement with a cutting wheel which continuously cuts narrow strips of fabric from the wide web.

Further, U.S. Pat. No. 3,840,112 to Walter J. Harting discloses a traveling endless grate conveyor having means for guiding the traveling conveyor along a predetermined path of travel. An upper run and a lower run of the conveyor are supported by guide roller bearings and include detachable adjustable thrust buttons which cooperate with stationary thrust plates positioned along the path of travel of the conveyor to limit drift or misalignment of the moving conveyor.

SUMMARY OF THE INVENTION

The present invention relates to a conveying apparatus for conveying a load. The apparatus includes a plurality of spaced article-support members each having a planar undersurface. The article-support members are supported for movement adjacent to a frame having a plurality of spaced-supporting surfaces which are positioned to engage the planar undersurfaces of the article-support members. The conveying apparatus further includes connecting means for connecting adjacent pairs of article-support members and means extending between adjacent pairs of article-support members for engaging the spaced-supporting surfaces of the frame. The engaging means has surfaces which are in planar alignment with the undersurfaces of the article-support members to provide a continuous surface with the undersurfaces of the article-support members at least when the article-support members are being supported on the spaced-supporting surfaces of the frame.

The conveying apparatus is utilized as an element for a cable fleeting apparatus which includes a plurality of the conveying apparatuses supported in a radial arrangement about a hub. The article-support members, which serve as cable-support members when a cable is wound about the cable fleeting apparatus, are arranged for movement in a direction parallel to the axis of the hub at least when the cable-support members are in a position for supporting the cable thereon. The hub is externally supported for rotation about its axis. The cable fleeting apparatus further includes means for rotating the hub about its axis and means for moving the cable-support members over the spaced-supporting surfaces of the frame to thereby move the cable from one side of the apparatus to the other.

BRIEF DESCRIPTION OF THE DRAWINGS

FIG. 4 is a side elevation view showing prior art cable fleeting module of the cable fleeting drum of FIG. 1;

FIG. 5 is a cross-sectional view taken along lines 5—5 of FIG. 4 showing structural features of the prior art cable fleeting module;

FIG. 6 is a partial elevation view showing prior art load links of a conveyor of the cable fleeting module of FIG. 4;

FIG. 10 is a cross-sectional view taken along lines 10—10 of FIG. 9 conveyor load links embodying certain principles of the invention.

DETAILED DESCRIPTION

Figure 1:
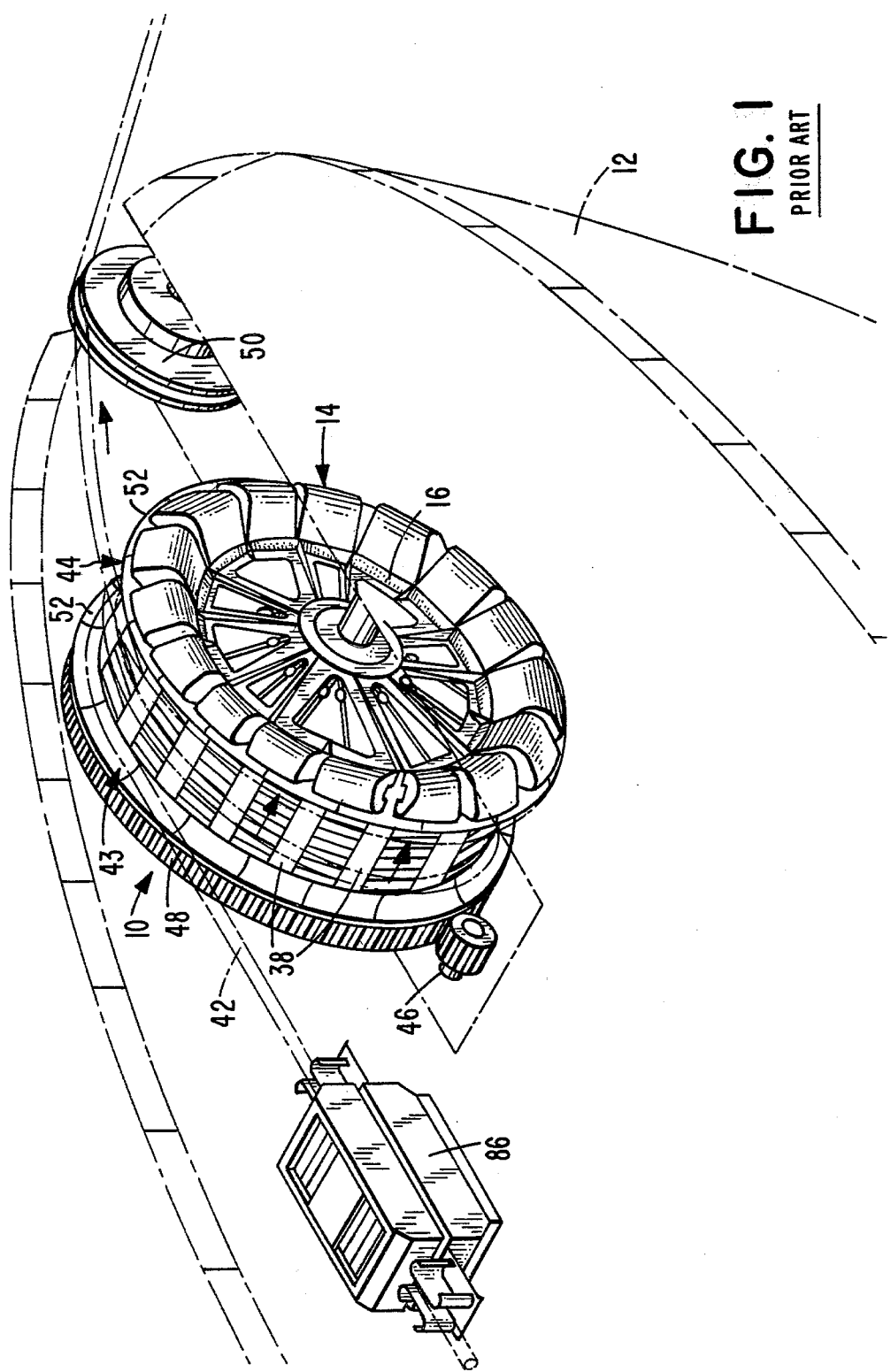
FIG. 1 is a perspective view showing a cable fleeting drum mounted aboard the stern of an ocean cable laying ship.

Referring to FIG. 1, there is illustrated a cable fleeting drum designated generally by numeral 10, mounted on the stern of a cable laying ship 12 for facilitating an oceanographic cable laying operation.

Figure 2:
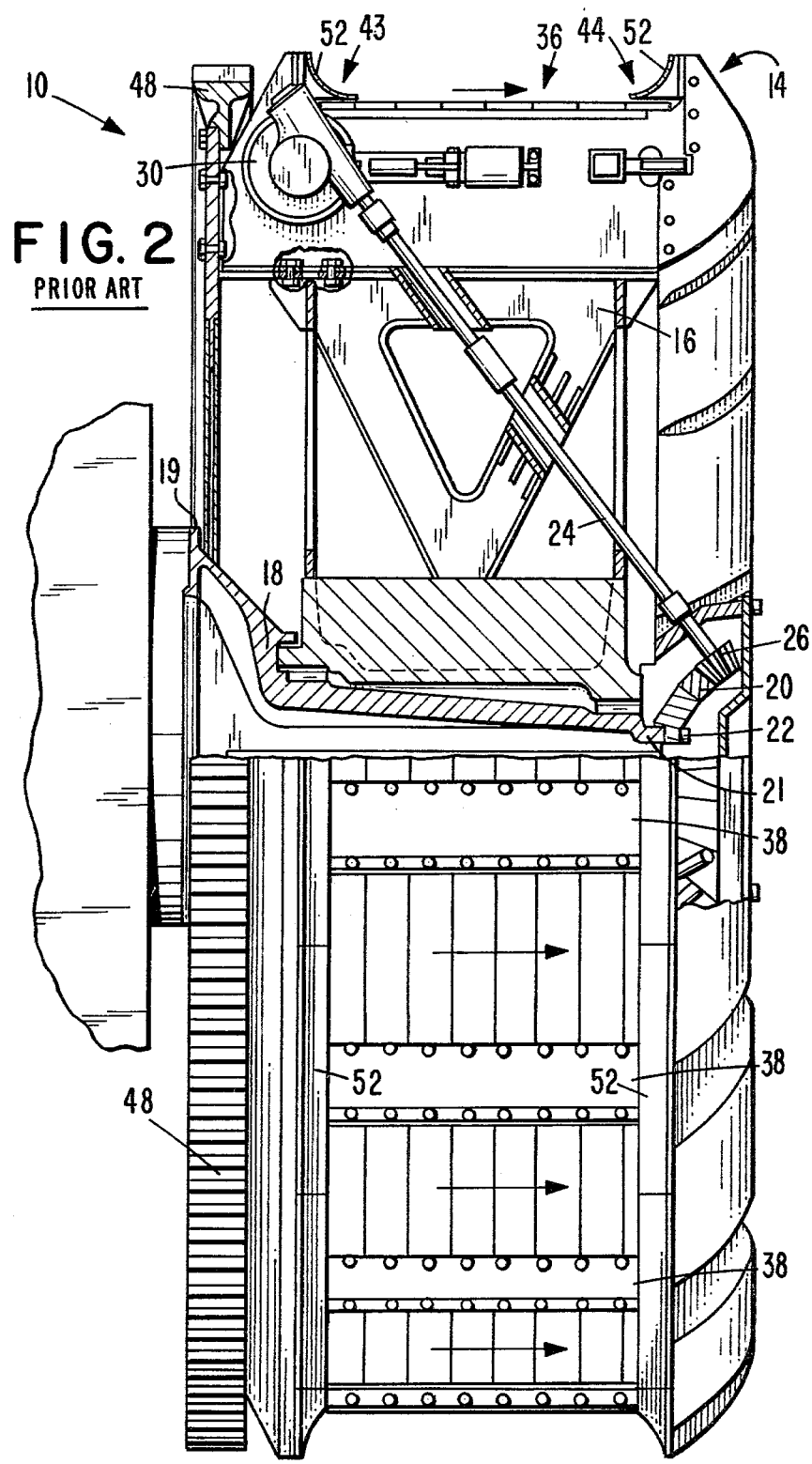
FIG. 2 is a front elevation view showing the cable fleeting drum of FIG. 1, with portions of the fleeting drum being broken away to illustrate the construction thereof.

The cable fleeting drum 10 includes a plurality of cable fleeting modules, designated generally by the numeral 14, radially arranged about a web-like hub 16. Referring to FIG. 2, the hub 16 is mounted for rotational movement about a fixed axle 18 which is rigidly secured at one end 19 to a fixed portion of the ship 12. A sun ring gear 20 is attached at the other end 21 of the fixed axle 18 by bolts 22. Each cable fleeting module 14 includes a drive shaft 24 which has at one end a planetary pinion gear 26 positioned to engage the sun gear 20 on the fixed axle 18.

Figure 3:
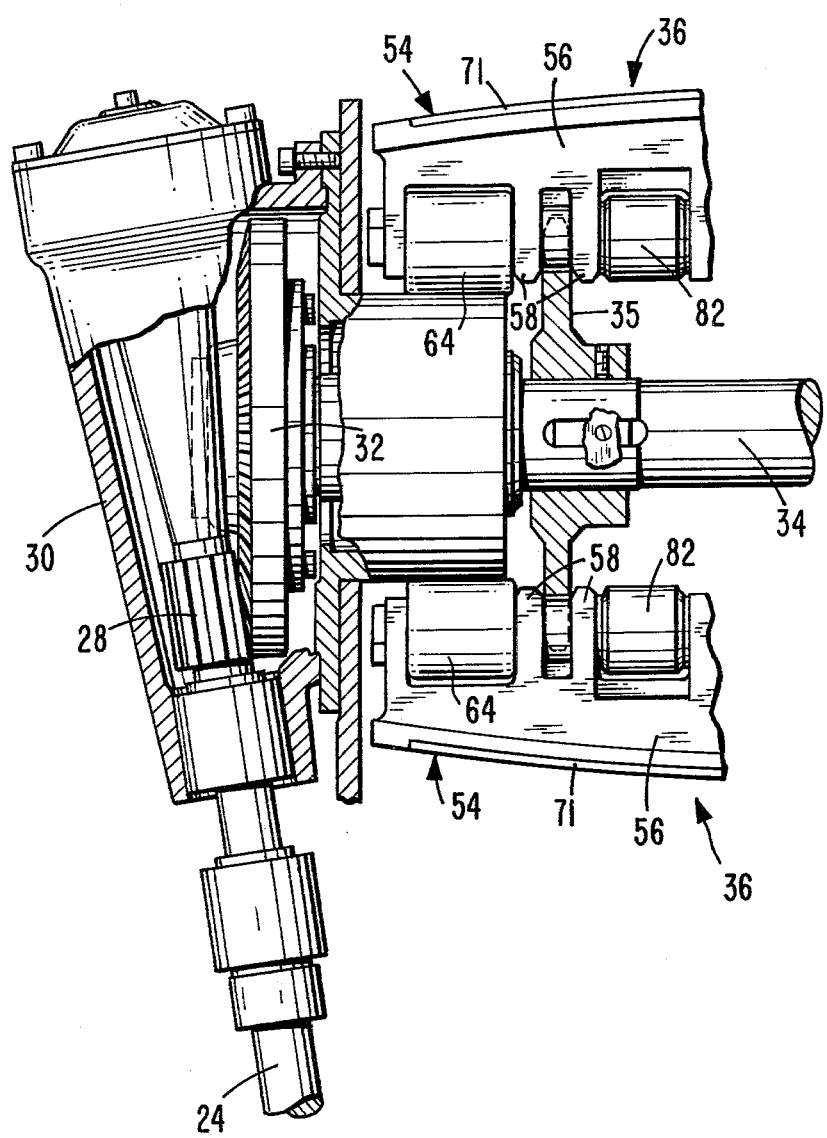
FIG. 3 is a partial elevation view showing a driving mechanism for a conveyor of the cable fleeting drum of FIG. 1.

Referring to FIG. 3, a worm gear 28 is coupled to the opposite end of the shaft 24 and is contained within a gear housing 30. The worm gear 28 is positioned adjacent to and in engagement with a spiroid gear 32 mounted on the end of a sprocket shaft 34. A pair of sprocket gears 35 (one shown) are coupled to spaced portions of the sprocket shaft 34.

Referring to FIGS. 1 through 4, each cable fleeting module 14 is a conveying apparatus and includes an endless conveyor, designated generally by numeral 36, which is positioned to move parallel to the axis of the drum 10. The upper runs of the endles conveyors 36 of the plurality of modules 14 are always exposed and form essentially the peripheral surface of the cable fleeting drum 10. As illustrated in FIGS. 1 and 2, a fixed plate 38 extends between adjacent fleeting modules 14 to give the peripheral surface of the fleeting drum 10 its generally cylindrical and continuous appearance. As viewed in FIG. 4, each of the conveyors 36 is guided over the sprocket gears 35 at one end of the module 14 and over arcuate bearings surfaces 40 (one shown) at the other end of the module.

In preparation for a cable laying operation, as viewed in FIGS. 1 and 4, a leading end of a cable 42 is drawn from a supply tank (not shown) aboard the ship 12, and is wound unstacked about the periphery of the cable fleeting drum 10 from an entry side, designated generally by numeral 43 to an exit side, designated generally by numeral 44, thereof. Thereafter, a drive gear 46 is operated to drive a bull gear 48 which is rigidly mounted at one side of the hub 16 to thereby drive the drum 10 about the fixed axle 18 in a clockwise direction as shown in FIG. 1.

As the drum 10 rotates, the planetary pinion gear 26 (FIG. 2) of each module 14 moves about the fixed sun gear 20 mounted on the axle 18 to rotate shaft 24 and worm gear 26 thus causing rotation of the sprocket shaft 34. As viewed in FIGS. 3 and 4, the sprocket gears 35 mounted on the sprocket shaft 34 engage portions of the conveyor 36 to facilitate the application of a driving force to the conveyor. Referring particularly to FIG. 4, as successive portions of the cable 42 are drawn onto the entry side 43 of the drum 10, the conveyors 36 (one shown) are simultaneously driven in the direction of the arrows, as illustrated in FIGS. 2 and 4, thereby urging the successive portions of the cable towards the exit side 44 of the drum 10. The successive portions of the cable 42 are passed over a sheave 50 (FIG. 1) and lowered to the ocean floor.

The movement of the cable 42 from the entry side 43 of the drum 10 to the exit side 44 thereof is called "fleeting." Fleeting prevents the successive portions of the cable 42, which are advancing onto the drum 10, from stacking onto portions of the cable already wound over the periphery of the drum 10. Cable stack-ups on the surface of the fleeting drum 10 inhibit smooth uninterrupted payout of the cable 42 to the ocean floor.

Fleeting flanges 52 (FIGS. 2 and 4) are mounted at the entry side 43 and the exit side 44 of the drum 10 and are provided to retain the cable 42 on the peripheral portions of the fleeting drum during the cable laying operation. The fleeting flanges 52 are mounted at close tolerance above the surface of each conveyor 36 to prevent cables having smaller diameters from being trapped between the fleeting flanges and the conveyors during the cable laying operation.

Referring to FIGS. 4 and 5, in the past, each of the conveyors 36 of each cable fleeting module 14 included a plurality of load links designated generally by the numeral 54. As illustrated in FIG. 5, each load link 54 included a body member 56 having two sets of suspended, spaced, shaft supports 58 (one set shown)

formed with apertures 60. Each set of supports 58 supported a bearing shaft 62 within the apertures 60 which, in turn, supported outer load bearings 64 at opposite ends thereof and a central load bearing 66. bushings 67 were mounted on the bearing shafts 62 between adjacent shaft supports 58 to provide an engaging surface for the sprocket gears 35. A pair of spaced projections 68 extended vertically from the body member 56 in parallel with the shaft supports 58 and provided support for a pair of guide bearings 70. A high friction surface 71 was secured to the body member 56 of the load link 54 to resist cable slippage over the surface of the load link.

The load links 54 were supported for movement within a frame, designated generally by the numeral 72, of the module 14. The frame 72 included outer support members 74 and one central support member 76 which extended essentially the length of the frame. A guide rail 78 was mounted on the central support member 76 and provided a load bearing surface for the central load bearing 66 and a guide surface for the guide bearings 70. The guide bearings 70 straddled the guide rail 78 and were provided to resist thrust forces exerted on the conveyor 36 so as to prevent drift or misalignment of the conveyor as the conveyor was moved relative to the frame 72. Each of the outer support members 74 had a bearing pad 80 mounted thereon to provide a bearing surface for the outer load bearings 64.

Connecting links 82 (FIGS. 4 and 5) were used to interconnect adjacent load links 54 by having one portion positioned about and connected to one bearing shaft 62 of one load link and another portion positioned about and connected to the adjacent bearing shaft of the adjacent load link. As particularly illustrated in FIG. 5, each bearing shaft 62 had two connecting links 82 connected thereto. Thus, use of the connecting links 82 provided for the endless configuration of the conveyor 36 as illustrated in FIG. 4.

During certain periods when the drum 10 was being moved about the fixed axle 18, the portion of the conveyor contained within the frame 72, as illustrated at the lower portion of FIG. 5, was supported by a pair of rails 84 which extended essentially along the length of the frame. During other periods, the frame-contained portions of the conveyor 36 were supported by the outer support member 74 and the central support member 76. For example, when the particular conveyor 36 was at the top of the drum 10 as illustrated in FIG. 1, the ends of the shaft 62 would be resting on the rails 84 (FIG. 5). When the same conveyor 36 was at the bottom of the drum 10, the outer load bearings 64 (FIG. 5) would be resting on the outer support members 74 and the central load bearing 66 would be resting on the central support member 76.

When lowering the cable 42 into the ocean floor during the cable laying operation, a significant amount of tension is developed on the cable. The tension is due primarily to the weight of the paid-out cable 42 and the drag forces that develop in the cable as the ship 12 is moved through the ocean. The tension in the cable 42 is greatest at the exit side 44 of the drum 10 and is reduced exponentially at the entry side 43 as the number of turns about the drum increases for a given cooefficient of friction on the surface of the drum. A cable back-tension apparatus 86 provides constant back tension on the cable 42 at the entry side of the drum 10 of greater magnitude than the tension required at the entry side of the drum to prevent the cable from slipping over the surface of the drum during a cable laying operation.

The tension in the cable 42 would place a high load on the load links 54 of the conveyor 36 particularly near the exit side 44 of the fleeting drum 10. The adjacent load links 54 of the upper run of the conveyor 36, which normally provided a planar surface under low-loading conditions, would form a nonplanar surface, as viewed in FIG. 6, when placed under high eccentric loading conditions. Under the high eccentric loads individual load links 54 would pivot on one of the load bearings 64 thereby causing a leading edge 86 of each of the load links 54 to protrude above the normally planar surface of the load links. This resulted in the protruding edge 86 being projected into a collision path with the fleeting flange 52. This pivoting action is known as "shingling." As a result of shingling, the leading edge 86 of the load links 54 would strike the lower portion of the fleeting flange 52 and stop the forward movement of the conveyor 36, thus causing severe damage to the driving mechanism for the conveyor.

In addition, maintenance and repair of the cable fleeting module 14 was particularly difficult because of the construction of the conveyor 36. Each of the load links 54 of each conveyor 36 includes four outer load bearings 64, two central load bearings 66 and two guide bearings 70. Neither the bearing shafts 62 nor the vertical projections 68 of the load links 54 were provided with grease fittings because of space-strength constraints and inaccessibility of the shafts and vertical projection bearings. Instead, the bearings 64, 66 and 70, mounted on the bearing shafts 62 and vertical projections 68, respectively, were of the sealed, self-lubrication type. After a period of time, the sealed bearings 64, 66 and 70 lost the necessary lubrication for smooth operation and thus failure of one or more of nearly 2800 sealed bearings of the fleeting drum 10 was a common and frequent occurrence. When a plurality of the bearings 64, 66 and 70 on a particular module 14 failed to operate properly, the cable fleeting module became inoperable and the cable laying operation had to be temporarily discontinued so that the bearings could be replaced.

Bearing replacement on the conveyor 36 was accomplished by first removing the inoperable module 14 from the drum 10 and secondly removing the conveyor 36 from the frame 72. To remove the conveyor 36, one of the bearing shafts 62 had to be removed from within the apertures 60 of the shaft supports 58. However, during the operation of the cable fleeting drum 10, sea water tended to collect in apertures 60 of the shaft supports 58, resulting in corrosion, sand and salt deposits in and around these areas. Thus, the bearing shafts 62 would become frozen in the apertures 60 of the shaft supports 58. The bearing shafts 62 could not be readily removed from the load links 54 without the aid of tooling and equipment which is normally not available aboard the ship 12. Therefore, unless there were spare modules 14 aboard the ship 12, the cable laying operation would have to be totally abandoned so that the ship could return to port to replace or repair the inoperable cable fleeting module. This resulted in a time consuming and costly effort which usually required that the ship 12 be out of service for an extended period of time.

Figure 7:
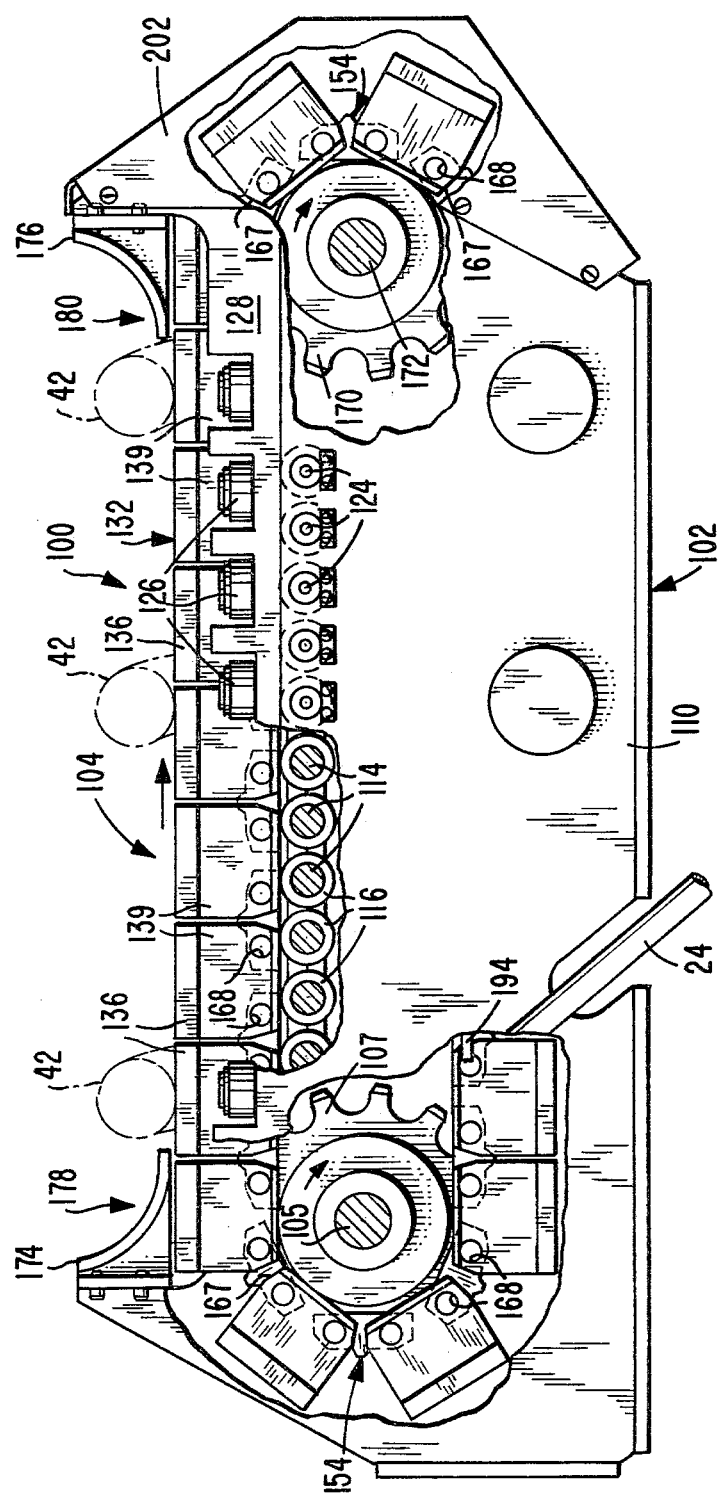
FIG. 7 is a side elevation view showing the cable fleeting module having an improved conveyor embodying certain principles of the invention.

The disadvantages associated with the above-described cable fleeting module 14 are overcome by providing an improved conveying apparatus or cable fleeting module, designated generally by the numeral 100, as viewed in FIG. 7. The cable fleeting module 100 includes a frame, designated generally by the numeral 102, and a conveyor designated generally by the numeral 104. The cable fleeting module 100 and the conveyor 104 derive a driving force in the same manner as described hereinabove with respect to the cable fleeting modules 14 and the conveyors 36 of the prior art. Therefore, for the purposes of describing the operation of the cable fleeting modules 100, it is to be understood that the driving forces applied thereto are derived through the sun ring gear 20, the pinion gear 26, the drive shaft 24, and the gears 28 and 32, as illustrated in FIGS. 2 and 3. The driving force is then applied to a sprocket shaft 105 (FIG. 7) which is a pair of spaced sprocket gears 107 (one shown) secured thereto for facilitating movement of the conveyor 104.

Figure 8:
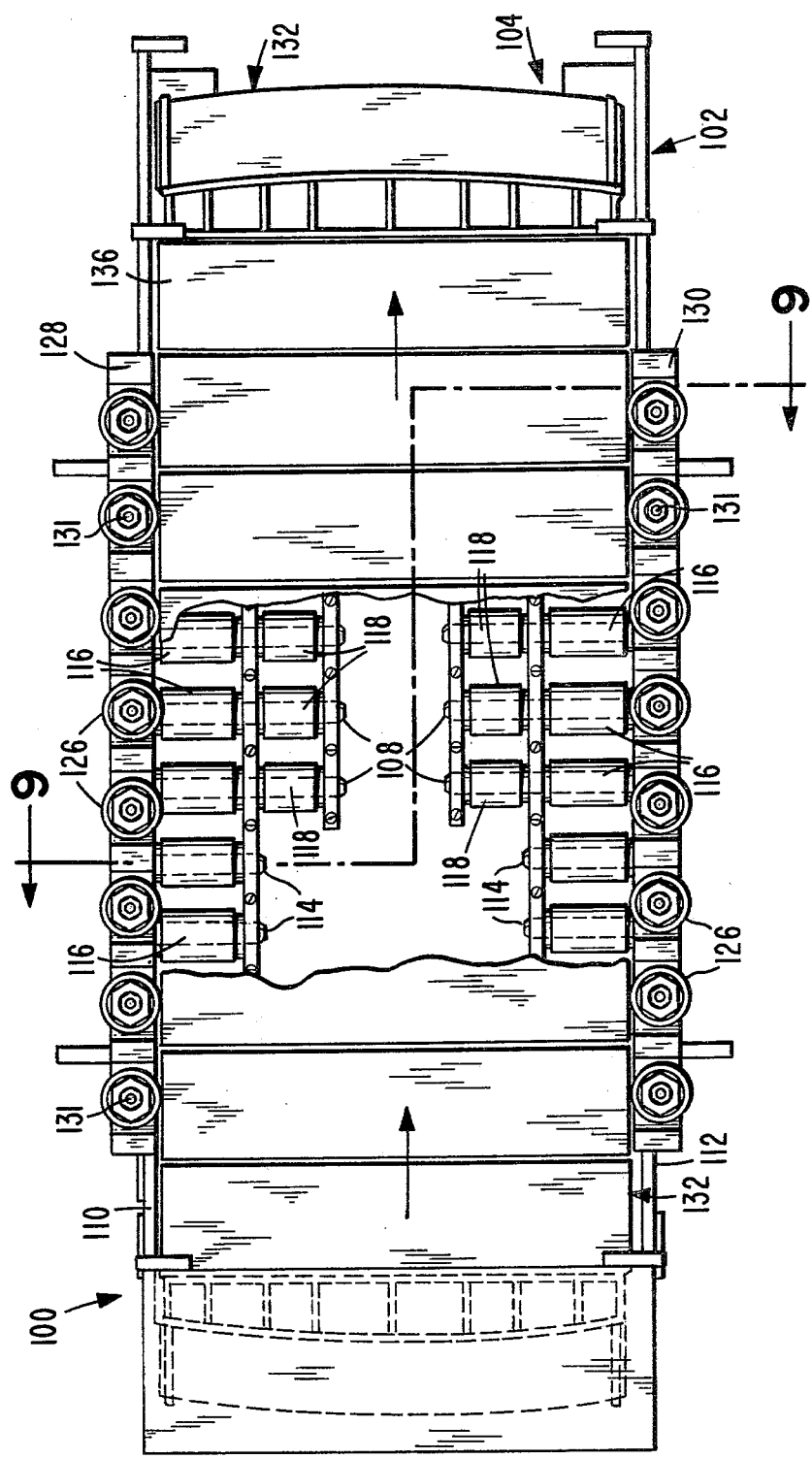
FIG. 8 is a plan view showing structural features of the cable fleeting module of FIG. 7.
Figure 9:
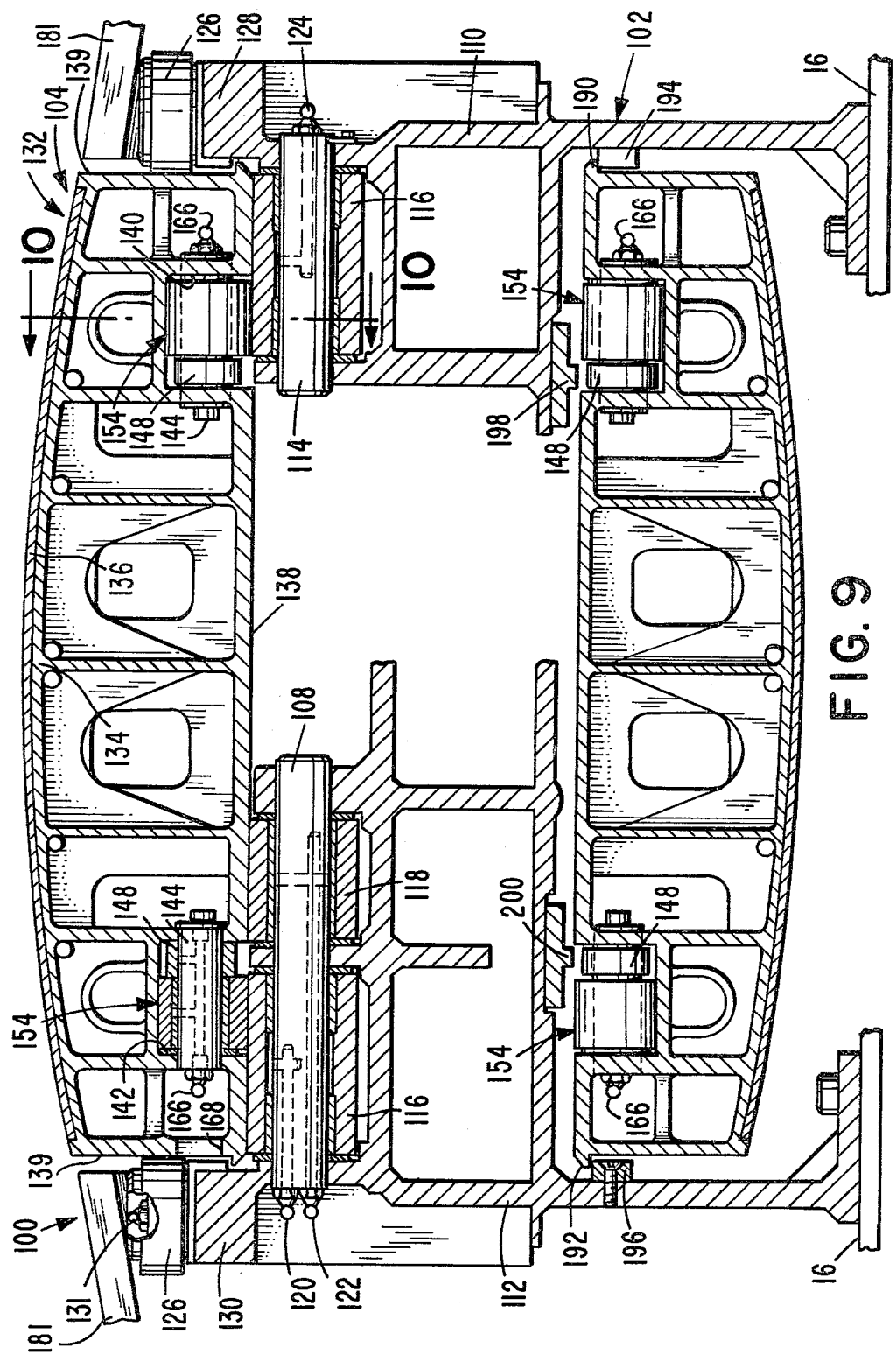
FIG. 9 is a cross-sectional view taken along lines 9—9 of FIG. 8 showing additional structural features of the cable fleeting module of FIG. 7.

Referring to FIG. 9, the cable fleeting module 100 is mounted on the hub 16 (FIG. 2) in the same manner as the prior art module 14 for rotation with the hub. The frame 102 of the module 100 is formed to support a plurality of parallel spaced, long bearing shafts 108, as illustrated in FIG. 8, which extend inwardly from opposite side walls 110 and 112 of the frame. As viewed in FIG. 8, the long bearing shafts 108 occupy an area which extends generally from the middle of the length of the frame 102 nearly to the right end thereof. Further, a plurality of parallel, spaced, short bearing shafts 114 also extend inwardly from the opposite side walls 110 and 112 and occupy an area which extends generally from the middle of the length of the frame 102 nearly to the left end thereof. The shafts 108 and 114 are located in the same plane.

As illustrated in FIGS. 8 and 9, each of the shafts 108 and 114 support for rotation a wide roller bearing 116 adjacent the side walls 110 and 112 of the frame 102. This provides for two rows of the roller bearings 116 in a parallel, spaced relationship with one row extending essentially along the length of the side wall 110 and the other row extending essentially along the length of the sidewall 112.

As further illustrated in FIGS. 8 and 9, the inward ends of each of the long bearing shafts 108 support for rotation a narrow roller bearing 118. This provides for two rows of the roller bearings 118 in a parallel, spaced relationship which, as illustrated in FIG. 8, extend from the middle of the length of the frame 102 to the right end thereof. The rows of narrow roller bearings 118 are located in the same plane with the wide roller bearings 116.

As illustrated in FIG. 9, each of the long shafts 108 is provided with grease fittings 120 and 122 and communicating passageways to facilitate lubrication of the roller bearings 116 and 118 mounted thereon. Each of the short shafts 114 is provided with a grease fitting 124 and a communicating passageway to facilitate lubrication of the wide roller bearings 116 mounted thereon.

As illustrated in FIGS. 8 and 9, two rows of guide rollers 126 are mounted on shelf portions 128 and 130 of the frame 102 above the side walls 110 and 112, respectively. As viewed in FIG. 8, grease fittings 131 are located axially within the top of each guide roller 136 to facilitate the lubrication of the guide rollers through communicating passageways in the shafts (not shown) which support the rollers for rotation.

Referring to FIGS. 7 through 10, the conveyor 104 includes a plurality of spaced, article-support members or load links, designated generally by the numeral 132. As illustrated in FIG. 9, each load link 132 is an integrally cast structure and made from a suitable material such as stainless steel. Each load link 132 is formed with a curved outer portion 134 which, at various times, functions as a portion of the peripheral surface of the drum 10 (FIG. 1). Each load link 132 has a roughened outer skin 136 which can be cast with or secured to the curved portion 134 of the load link to form a high friction surface which resist slippage of the fleeting cable 42 on the surface of the drum.

Each load link 132 is formed with a planar undersurface 138 and spaced side walls 139. The planar undersurface 138 has a pair of spaced through notches 140 and 142 formed therein. A pair of shafts 144 and 146 (FIG. 10) straddle and are supported on opposite walls of each of the notches 140 and 142. Each of the shafts 144 and 146 supports a sprocket-engaging bearing 148 and also has one of two apertures 150 and 152 (FIG. 10) of a connecting link, designated generally by the numeral 154, positioned thereabout. As illustrated in FIG. 10, each connecting link 154 is also formed with planar surfaces 156 and 158, with bevelled surfaces 160 and 162 and with a planar undersurface 164.

Referring further to FIG. 10, there is illustrated a pair of adjacent load links 132 which represent two of the plurality of load links arranged to form the endless conveyor 104 (FIG. 7). The aperture 150 of the centrally illustrated connecting link 154 is positioned about the shaft 146 of the load link 132 illustrated to the right. The aperture 152 of the centrally illustrated connecting link 154 is positioned about the shaft 144 of the load link 132 illustrated to the left. In this manner, the connecting link 154 connects the two adjacent load links 132 while the remaining plurality of connecting links are positioned in the same way to provide the linking of all of the load links to form the endless conveyor 104 (FIG. 7). While only one complete connecting link 154 is illustrated in FIG. 10 for connecting adjacent load links 132, it is to be understood that two such links are used to connect each adjacent pair of load links as illustrated in FIG. 9.

The sides of each of the load links 132 are formed with bevelled surfaces 167 (FIG. 10) to provide clearance between the adjacent load links as the links pass over the arcuate conveyor path at opposite ends of the conveyor 104 (FIG. 7).

Each of the shafts 144 is provided with a grease fitting (FIG. 9) 166 and communicating passageways to facilitate lubrication of the bearings 148 and the connecting links 154. Further, each load link 132 is formed with apertures 168 (FIGS. 7 and 9) which are axially aligned with and provide access to the grease fittings 166.

As illustrated in FIG. 7, the conveyor 104 is located within the frame 102 and is formed in the endless configuration to extend about the pair of spaced driven sprocket gears 107 (one shown) at one end of the module 100. At the opposite end of the endless conveyor 104, the conveyor extends about a pair of idler sprocket gears 170 (one shown) which are mounted spacially on an idler shaft 172 mounted to the frame 102. The teeth of the sprocket gears 107 and 170 are aligned with and engage the bearings 148 (FIG. 9) to provide the driving force for and guiding of the endless conveyor 104. The cable fleeting module 100 includes a pair of spaced fleeting flanges 174 and 176 located at cable entry and exit sides 178 and 180, respectively.

As illustrated in FIGS. 7, 8 and 9, the wide and narrow roller bearings 116 and 118, respectively, cooperate to form a plurality of spaced supporting surfaces for supporting the plurality of load links 132 of the conveyor 104. The planar undersurface 138 of each of the load links 132 engages and moves over the spaced supporting surfaces of the roller bearings 116 and 118 as the endless conveyor 104 is moved within the frame 102. In addition, the connecting links 154 engage and move over the spaced supporting surfaces of the roller bearings 116 and 118 as the endless conveyor 104 is moved within the frame 102. In this manner, the roller bearings 116 and 118 provide rolling support for the moving conveyor 104 when the load links 132 thereof are moving between the fleeting flanges 174 and 176 and are subject to the load placed thereon by the cable 42 being fleeted thereover. As further illustrated in FIG. 9, cover plates 181 are secured to and between adjacent cable fleeting modules 100 to provide a continuous smooth peripheral surface for the drum 10.

As illustrated in FIGS. 8 and 9, the guide rollers 126 engage the side walls 139 of the load links 132 passing adjacent thereto. The guide rollers 126 are provided to resist thrust forces exerted on the conveyor 104 during a cable laying operation so that the conveyor will not stray or drift from the desired path of movement as the cable is being fleeted across the peripheral surface of the drum 10 (FIG. 1).

As the cable 42 being fleeted approaches the fleeting flange 176 (FIG. 7) at the cable exit side 180 of the module 100, additional stresses are placed on the load links 132 in this area. During the periods of additional stresses, each load link 132 receives additional under support from the two rows of the roller bearings 118 (FIG. 8).

Referring to FIG. 10, there is illustrated in phantom two portions of the cable indicated by the numerals 42a and 42b. Cable 42a is centrally located on the load link 132 while cable 42b is located over a gap 182 between the two adjacent load links.

If cable 42a is centrally located on the load link 132, the load exerted downwardly upon the load link by the cable is supported by two bearings 116 until the link moves to a new position wherein the majority of the load would be supported by one bearing. The stress in the undersurface 138 of the load link 132 is highest at the point of engagement of the undersurface with the roller bearings 116. Adjacent roller bearing 116 are spaced such that when a load link 132 is positioned as the load link on the right in FIG. 10, the respective adjacent roller bearings engage the undersurface 138 away from the lower corners of the load link to provide sufficient engagement area to minimize the stress concentrations on the lower corners of the load link. If the adjacent roller bearings 116 were to contact the undersurface 138 of the load link at or very near the corners under the loading condition of 42a, as shown in FIG. 10, the load would be distributed over very small areas of the lower corners and the resulting stress concentrations could cause wear or breakage of the load link at the corners. When the load link 132 is in the position such that the majority of the load from cable 42a is supported by one roller bearing 116, the load on the undersurface 138 of the load link at point of engagement of the roller bearing is great, but the effect of the stress concentration is minimized by the area over which the stress is distributed.

However, when the load link 132 is moved over the roller bearings 116, the initial contact area of the lower corners of the load link with the sequential roller bearings is infinitely small and thus there would tend to be a great concentration of stresses on the lower corners of the load link as the load link initially engages each sequential roller bearings.

Furthermore, if a cable is positioned at or near the gap 182 as the cable 42b in FIG. 10, the majority of the load exerted downwardly by the cable would be supported by the one roller bearing 116 under the lower corner of one or both of the adjacent load links. This loading condition would tend to concentrate the stress in the undersurface 138 of the load link 132 over the small area of the lower corners. As the load link 132 is moved over the sequential roller bearings 116 the initial contact area of the lower corners of the load link with the sequential roller bearing would be infinitely small and the corresponding stress in the corners would be infinitely great. In either loading condition, 42a or 42b, a high stress concentration in the corners of the load link 132 as the load link moves over the roller bearings 116 could cause wear or breakage of the load link, particularly at the corners thereof.

As further illustrated in FIG. 10, the gap 182 is aligned with a gap 184 located between the centrally illustrated pair of adjacent roller bearings 116. The alignment of the gaps 182 and 184 occurs many times during a cable fleeting operation. When the load from cables 42a or 42b is supported by primarily one bearing 116 against the undersurface 138 of the load link 132, as the load link is moved over the plurality of roller bearings, the load exerts a rotational moment about that resisting roller bearing, tending to depress one lower corner of the load link into a typical gap 184. These loading conditions tend to create shingling problems or undulations in the moving conveyor 104 on the peripheral surface of the drum.

To assist in supporting the load links 132 during these periods, each connecting link 154 is formed with the planar undersurface 164 which is in planar alignment with the planar undersurfac 138 of the load link to provide a continuous moving conveyor surface as the gap 182 passes over the gap 184. Further, the planar surfaces 156 and 158 of the connecting link 154 are in supportive engagement with upper wall portions of the through notches 140 of the adjacent load links 132. In this manner, the connecting link 154 cooperates with the load links 132 to partially absorb the load of the load links thereby reducing the stresses on the lower corner portions of the respective adjacent load links. As the gap 182 momentarily moves over the roller bearings 116 and and 118, the connecting links 154 provide a major portion of the support for the load resulting from cable 42a or 42b. In addition, the planar surfaces 156, 158 and the planar undersurface 164 of the connecting link 154 cooperate with respective portions of the load link 132 to prevent shingling and undulation of the conveyor as the conveyor moves over the roller bearings 116 and 118. Thus, the conveyor 104 overcomes the deficiencies apparent in the conveyor 36 (FIGS. 4 and 5) of the prior art cable fleeting module 14.

The connecting links 154 are also formed with the bevelled surfaces 160 and 162 to provide for sufficient clearance between the connecting links and the load links 132 as the links pass over the arcuate portions of the conveyor path at opposite ends of the conveyor 104 (FIG. 7). Each of the connecting links 154 is formed with a central projection 186 which fits into complimentary structure of the two adjacent load links 132 and provides additional support.

Referring to FIG. 9, each of the load links 132 is formed with a pair of overhanging lips 190 and 192 along opposite side edges thereof. The lips 190 and 192 are positioned to ride on a pair of rails 194 and 196, respectively, which are secured to the side walls 110 and 112, respectively, of the frame 102. Further, a pair of rails 198 and 200 are secured to the frame 102 and are positioned to provide a bearing surface for the bearings 148. When a particular module 100 is located at the top of the drum 10, the lower run of the related conveyor 104 will be in the position as illustrated in FIG. 9 and the lips 190 and 192 will be riding on the rails 194 and 196, respectively. When the same module 100 is located at the bottom of the drum 10, the lower run of the conveyor 104 will be situated such that the bearings 148 will be riding on the rails 198 and 200.

Each of the cable fleeting modules 100 is provided with an end cover 202 (FIG. 7) which is removably secured to the frame 102. The cover 202 can be removed from the frame 102 without removing the cable fleeting module 100 from the drum 10. After the cover 202 has been removed, the apertures 168 (FIG. 7) are exposed and provide direct access to the grease fittings 166 (FIG. 9). In this manner, the area of the load links 132 and bearings 148 about the shafts 144 can be lubricated by stepping the conveyor 104 through the area exposed by the removal of the cover 202 without the necessity of removing the modules 100 or the conveyors 104 from the drum 10. Additionally, the cover plates 181 can be removed to provide access to the grease fittings 120, 122, 124 and 131 to facilitate the lubrication of the roller bearings 116 and 118 and the guide rollers 126 and 128. The lubrication of these elements also can be accomplished without removing the cable fleeting modules 100 or the conveyor 104 from the drum 10. This technique permits the lubrication of all critical parts of each cable fleeting module 100 without removing the module or the conveyor 104 from the drum 10 and can be accomplished on the ship 12 while at sea with a relatively limited number of simple tools. Therefore, the costly and inefficient technique previously employed has been avoided by the cable fleeting module 100 and conveyor 104.

Further, by removing the end cover 202 (FIG. 7), the fleeting flanges 174 and 176 (FIG. 7), the cover plates 181 (FIG. 9), and the bearing assemblies 126 (FIG. 9), the conveyor assembly 132 can be disconnected and lifted from the frame 102, thereby providing access for servicing and replacing the bearings 116, 118 and 126 without removing the module from the drum 10.

What is claimed is:

1. A conveying apparatus, which comprises:
   a plurality of spaced article-support members, each of said article-support members having a planar undersurface;
   a frame;
   a plurality of spaced supporting surfaces mounted on said frame for supporting said article-support members for movement, said spaced supporting surfaces positioned to engage said planar undersurfaces of said article-support members;
   means for connecting adjacent pairs of said article-support members;
   means extending between adjacent article-support members and having surfaces in planar alignment with the undersurfaces of said article-support members for engaging the spaced supporting surfaces to provide a continuous planar surface with the undersurfaces of said article-support members at least when the article-support members are supported on the spaced supporting surfaces; and
   means for moving said article-support members relative to said supporting surfaces.

2. A conveying apparatus as set forth in claim 1, wherein said plurality of spaced supporting surfaces of said frame include a series of spaced roller bearings.

3. A conveying apparatus as set forth in claim 1, wherein said engaging means includes a plurality of links, each of said links extending between respective adjacent article-support members, each of said links having an undersurface in planar alignment with said planar undersurfaces of said adjacent article-supporting members at least when said adjacent article-support members are supported on said spaced supporting surfaces.

4. A conveying apparatus as set forth in claim 2, wherein said plurality of spaced article-support members are connected by said connecting means on said frame in an endless configuration.

5. A conveying apparatus as set forth in claim 4, wherein the endless configuration of the spaced article-support members forms an arcuate path along a portion thereof and wherein said article-support members are formed with adjacent surfaces which provide clearance between adjacent article-support members as said article-support members pass over the arcuate path.

6. A conveying apparatus as set forth in claim 4, wherein the endless configuration of the spaced article-support members forms an arcuate path along a portion thereof and wherein said connecting means includes a plurality of connecting links, each connecting link being connected to and extending between respective adjacent article-support members, said connecting links being formed with surfaces which provide clearance between said connecting links and said article-support members as said connecting links and said article-support members pass over the arcuate path.

7. A cable fleeting apparatus, which comprises:
   a hub;
   means for supporting the hub for rotation;
   a plurality of cable-transporting conveyors wherein each conveyor comprises:
      a plurality of spaced cable-support members, each of said cable-support members having a planar undersurface;
      a frame;
      a plurality of spaced supporting surfaces mounted on said frame for supporting said cable-support members for movement, said spaced supporting surfaces positioned to engage said planar undersurfaces of said cable-support members;
      means for connecting adjacent pairs of said cable-support members; and
      means extending between adjacent cable-support members and having surfaces in planar alignment with the undersurfaces of the cable-support members for providing a continuous surface with said undersurfaces of the cable-support members at least when the cable-support members are supported on the spaced supporting surfaces;
   means secured to and extending radially outwardly from the hub for supporting the conveyors in a radial arrangement about the hub with the cable-support members mounted for the movement in a direction parallel to the axis of the hub at least when the members are in a position to support a calbe thereon; and means for rotating the hub and for moving the cable-support members over the support surfaces.

8. A cable fleeting apparatus as set forth in claim 7, wherein said plurality of spaced supporting surfaces of said frame are defined by a series of spaced roller bearings.

9. A cable fleeting apparatus as set forth in claim 7, wherein said engaging means includes a plurality of links each of said links extending between respective adjacent cable-support members, each of said links having an undersurface in planar alignment with said planar undersurfaces of said adjacent cable-support members at least when said adjacent cable-support members are supported on said spaced support surfaces.

10. A cable fleeting apparatus as set forth in claim 7, wherein said plurality of spaced cable-support members are connected by said connecting means on said frame in an endless configuration.

11. A cable fleeting apparatus as set forth in claim 10, wherein the endless configuration of the spaced cable-support members form an arcuate path along portions thereof and wherein said cable-support members are formed with adjacent surfaces to provide clearance between adjacent cable-support members as said cable-support members pass over the arcuate path.

12. A cable fleeting apparatus as set forth in claim 10, wherein the endless configuration of the spaced cable-support members form an arcuate path along portions thereof and wherein said connecting means includes a plurality of connecting links, each connecting link being connected to and extending between respective adjacent cable-support members, said connecting links being formed with surfaces which provide clearance between said connecting links and said cable-support members as said connecting links and said cable-support members pass over the arcuate path.

* * * * *